(12) United States Patent
Herbst

(10) Patent No.: US 7,258,800 B1
(45) Date of Patent: Aug. 21, 2007

(54) ELECTROCOAGULATION WASTE WATER BATCH TANK TREATMENT SYSTEM

(76) Inventor: Robert J. Herbst, 2345 S. Federal Blvd., Suite 60, Denver, CO (US) 80219

( * ) Notice: Subject to any disclaimer, the term of this patent is extended or adjusted under 35 U.S.C. 154(b) by 287 days.

(21) Appl. No.: 10/926,173

(22) Filed: Aug. 26, 2004

(51) Int. Cl.
*C02F 1/40* (2006.01)
*C02F 1/463* (2006.01)

(52) U.S. Cl. .................. 210/703; 210/748; 210/802; 210/803; 210/804; 210/172.1; 210/243; 210/257.1; 210/258; 210/262; 210/415; 210/418; 210/532.1; 210/538

(58) Field of Classification Search ............ 210/243, 210/256, 257.1, 258, 259, 262, 415, 418, 210/522, 532.1, 533, 534, 538, 703, 748, 210/802–804, 172.1; 204/571, 665, 666, 204/673; 205/742, 751
See application file for complete search history.

(56) References Cited

U.S. PATENT DOCUMENTS 3,664,951 A * 5/1972 Armstrong ................ 210/707
4,623,436 A * 11/1986 Umehara ................... 205/743
5,759,390 A * 6/1998 Essop et al. ............. 210/221.2

\* cited by examiner

Primary Examiner—Matthew O. Savage
(74) Attorney, Agent, or Firm—Edwin H. Crabtree; Ramon L. Pizarro

(57) ABSTRACT

A waste water treatment system and process for treating waste water received in a batch tank. The waste water is discharged in a headwork screen for removing large solids in the water. The solids are into a sludge drying bin. The screened water is transferred into a top of an influent surge tank with an oil/water separator. The oil/water separator includes a plurality of coalescing plates for separating free oil from the waste water. Heavy solids in the surge tank are drained into the sludge drying bin. The waste water is now dropped into a containment pan. From the containment pan, the waste water is pumped into a water treatment tank. The water treatment tank includes two or more electrodes mounted in the top thereof. The electrodes are separated using insulating support spacers for providing proper electrode spacing and insulation between the electrodes. The electrodes are used for providing current to the waste water and separating the contaminates in the water by electrocoagulation. The treated water in the water treatment tank is discharged after a completion of a period of settling or dwell time into a clean water tank.

20 Claims, 3 Drawing Sheets

ELECTROCOAGULATION WASTE WATER BATCH TANK TREATMENT SYSTEM

BACKGROUND OF THE INVENTION (a) Field of the Invention

This invention relates to a system and a process for treating influent waste water and more particularly, but not by way of limitation, to an electrocoagulation waste water batch tank treatment system and process for greatly reducing various types of contaminates held in suspension in the waste water.

(b) Discussion of Prior Art

The evolution of electrocoagulation is driven by a need to make waste water treatment processes more efficient. Recent increases in electrical costs and metal have changed the goals from optimum treatment efficiency to reduced operating costs. Many of the exotic configurations requiring specific electrode materials have given way to trying to utilize available stock material. New ideas have helped reduce electrode costs, but still there is a need for a more versatile, more flexible, standard design using inexpensive materials and components. The subject invention disclosed herein attempts to reduce system materials and components to a lowest common denominator.

Heretofore, previous "flow-through" and "static" water treatment processes have had flaws that prevented them from being viable treatments for large, complex and variable waste streams. A particular flaw was the scaling and plugging of electrodes, which plagued the treatment process as the waste water stream changed in composition. It is possible to develop a treatment scheme that will not plug the electrodes if the composition of the stream remained relatively consistent, but not if the composition varies. Efforts to install elaborate monitoring and control systems have failed when waste stream contaminants coated or blinded sensors, thus rendering the system controls useless. Other methods have been employed to prevent scaling and plugging of the electrodes including polarity reversing and other processing aids. But these methods have proven to be unreliable.

Methods for increasing dwell time for contaminated water in electrode modules and the surface area of the electrodes have been tried by increasing the number of electrode plates in the module or increase the number of modules. But, these optional methods increase the pumping pressure of the water necessary to push the fluid through the electrode modules. The increased water pressure causes extra strain on electrode module gaskets and if the pressure is high enough, leaks and failure of the module may occur. Additionally, in these cases, there is little or no chance for the precipitate to develop or coagulate into bigger particles or for any secondary separation to occur between the modules and electrode plates. The limited coagulation time increases the need for the residence time in the foam removal apparatus and the clarifier in order to allow for the formation of coagulated floc and its subsequent increase in size and density. The designing of a waste water treatment system to allow for more or less residence time in batch tanks and clarifiers is very difficult.

In previous electrocoagulation processes, including tubular modules as described in U.S. Pat. Nos. 4,293,400 and 4,378,276 to Liggett, improved removal rates have been shown. The improvements were due to the pre-alignment effect of passing the water to be treated through the electronegative or electropositive backside of the electrodes. These methods served to align the contaminant molecules and ions in the waste stream and made them more susceptible to react as the electrical current or electromotive force was introduced into the waste stream. This electrochemical phenomena is further enhanced by the subject invention by the application of reversing polarity of the direct electrical current, which provides the electromotive force to drive the electrochemical reaction.

In U.S. Pat. No. 5,587,057 to Metzler et al., an electrocoagulation process is described having electrodes for treating a highly conductive liquid. In U.S. Pat. No. 6,613,202 to Herbst et al. and U.S. Pat. Nos. 5,043,050, 5,423,962, 6,179,977, 6,241,861 and 6,746,593 to Herbst, the inventor of the subject invention, Robert J. Herbst describes different types of improved electrolytic and electrochemical water treatment processes for treating aqueous solutions using conductive conduits and precipitating various organic and inorganic materials suspended in the solution.

None of the above mentioned prior art electrolytic and electrochemical systems and processes for treating waste water disclose the unique features of the subject invention which provides for treating large volumes of complex and variable waste water with reliability and functionality not obtainable with other electrocoagulation batch tank water treatment systems and processes.

SUMMARY OF THE INVENTION

In view of the foregoing, it is a primary objective of the subject invention to treat contaminated fluid from 55 to 2500 gallons in a batch tank. The batch tank system can include a plurality of tanks for treating waste water in a sequential basis. For example, where each tank treats the waste water, separates the contaminates and then is readied for a next treatment batch in a sequence with the other tanks. This process can be used to facilitate continuous flow streams that require a batch style treatment.

Another object of the invention is the system and process is designed to treat waste water that is both complex and with variable contaminate compositions. The contaminated fluid can be treated in phases in the batch tank with sludge by-products harvested at various points in the overall system.

Still another object of the waste water treatment system is to greatly reduce contaminate levels in the water using flexible, high surface area sheet or plate metal electrodes which are easy to change out. The electrodes are vertically mounted, supported and separated from each other using insulating support spacers. The spacers are used to modify electrode spacing. Also, the support spacers allow the electrodes to slide easily in and out between the slots for cleaning. The electrodes and spacers can be constructed of various types of inexpensive materials with variable thicknesses.

Yet another object of the treatment system and process is to reduce pumping needs by reducing the number of pumps required and eliminating specialty pumps required for providing higher pressures for pressurized electrodes. The subject invention uses gravity to provide a driving force in moving the waste water to be treated through the system. Also, the system operates at atmospheric pressure and eliminates the need for pressure seals and gaskets.

The subject waste water treatment system for treating waste water includes pumping influent water from a waste water source into a batch tank. The waste water is discharged in a headwork screen for removing large solids in the water. The large solids are removed and dropped into a sludge drying bin. The screened water is then transferred into a top of an influent surge tank with an oil/water separator.

The oil/water separator includes a plurality of stacked coalescing plates for separating a majority of free oil from the waste water. The oil at the top of the surge tank is removed via an oil decant valve. The heavy solids at the bottom of the surge tank are drained into the sludge drying bin. An influent waste water valve near the bottom of the surge tank is used to drop the waste water into a central waste water containment pan in the bottom of the batch tank. The containment pan acts as an overall collection area for spilled fluid and as a structural skid for the batch tank. From the containment pan, the waste water is pumped upwardly filling a water treatment tank in the top of the batch tank.

The water treatment tank includes two or more electrodes mounted in the top thereof. The electrodes are separated using insulating support spacers for providing proper electrode spacing and insulation between the electrodes. The electrodes are connected to electric leads attached to an independent DC power supply. The DC power supply is mounted in the batch tank and next to the water treatment tank. The electrodes are used for providing current to the waste water and separating the contaminates in the water by electrocoagulation. Some of the contaminates can be removed from the water in the form of floating material or foam, which floats over an open top of the treatment tank and downwardly into collection gutters on both sides of the tank and then into a V-Filter for dewatering.

The V-Filter is disposed below the water treatment tank. Heavy solids that are collected in the bottom of the water treatment tank are also discharged into the V-Filter. The V-Filter includes perforated panels cover with filter cloth and an auger for lifting heavy solids upwardly from the bottom of the filter. The heavy solids are discharged from the top of the auger into the sludge drying bin. Water passing through the filter cloth is discharged into the containment pan.

The electrocoagulated treated water in the water treatment tank is discharged after a completion of a period of settling or dwell time. At this time, a clean water valve is opened next to a side of the water treatment tank. The clean water flows through a water flute mounted above the bottom of the tank, through the clean water valve, through a bag filter and a polish filter and then finally into a clean water tank. The clean water tank is mounted near the bottom of the batch tank and above the containment pan.

The clean water can now be removed from the clean water tank. Also, the sludge can be removed using a forklift to lift the sludge drying bin out of the batch tank for cleaning. After removing the clean water and cleaning and returning the sludge drying bin to the batch tank, the water waste water treatment process is completed. The treatment system can now be started again with another batch of influent waste water.

These and other objects of the present invention will become apparent to those familiar with different types of systems and processes for electrolytic, electrochemical or electrocoagulation treatment of high volumes of contaminated water when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the principles thereof, and in which.

DESCRIPTION OF THE PREFERRED EMBODIMENTS

Figure 1:
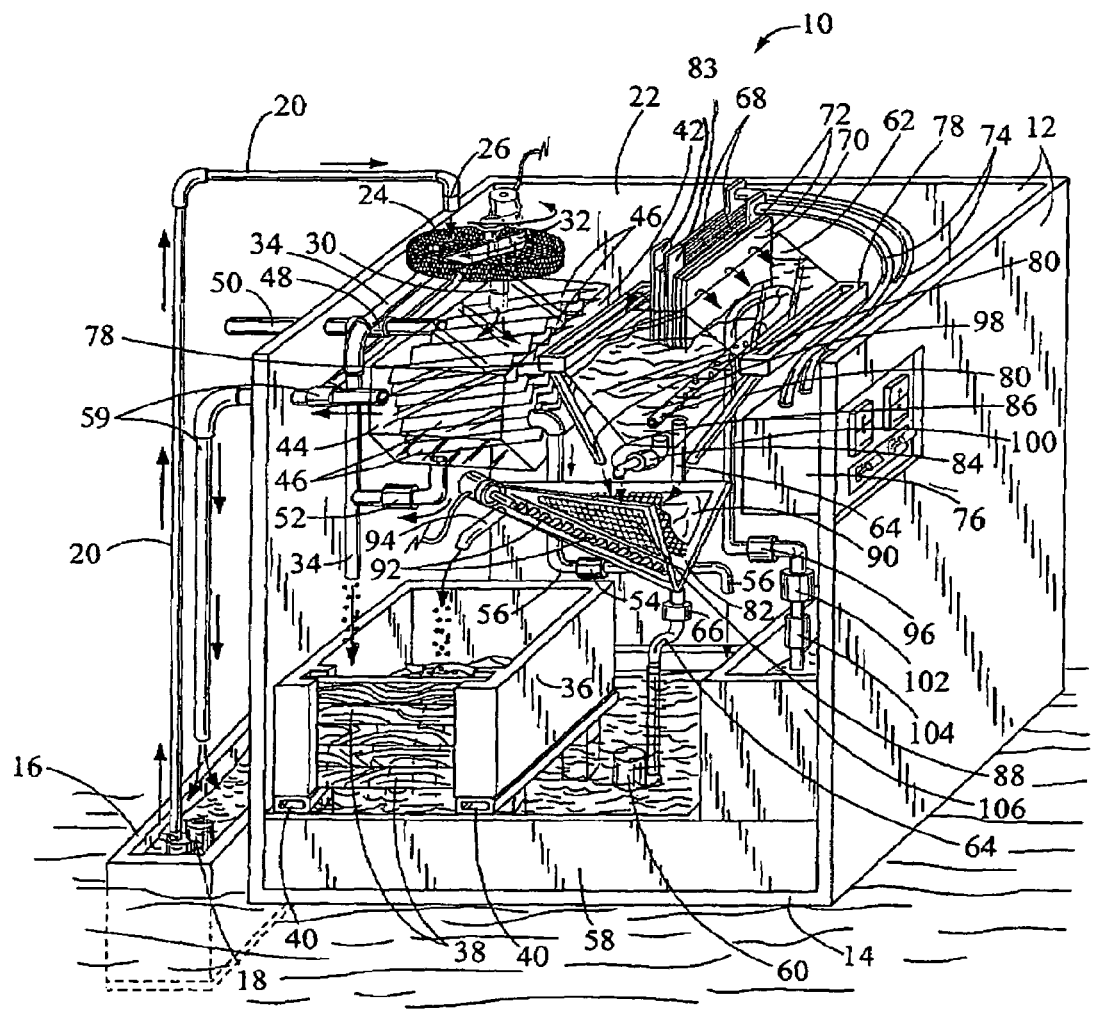
FIG. 1 illustrates the individual components making up the subject electrocoagulation waste water batch tank treatment system. The batch tank treatment system is used for treating and cleaning the waste water circulated through the components mounted in a batch tank. The batch tank is designed to typically treat 200 gallons or more of waste water.

In FIG. 1, a perspective view of the individual components making up the subject electrocoagulation waste water batch tank treatment system is illustrated. The overall treatment system has a general reference numeral 10. As mentioned above, the system 10 is used for treating and cleaning waste water circulated through the components mounted in a batch tank 12. The front and the top of the tank 12 have been cutaway for ease in viewing the individual components mounted therein. The batch tank is designed to typically treat 50 to 2500 gallons of waste water and can have dimensions in a range of 2 to 8 feet in width, 4 to 24 feet in length and 4 to 10 feet in height. A bottom 14 of the tank 12 can be adapted for mounting on skids for ease in transporting the unit from one location to another and treating different sources of water.

In this drawing, waste water is received in a waste water sump 16 or a buried waste tank next to the batch tank 12. Obviously, the waste water can be stored in a pond, lagoon and other types of water storage facilities prior to being treated. The sump 16 includes a feed pump 18 with intake pipe 20 for pumping the influent waste water to a top 22 of the batch tank 12.

The waste water is discharged into a headwork screen 24 via a screen inlet pipe 26 attached to an end of the intake pipe 20. The detail structure of the headwork screen 24 is disclosed in U.S. Pat. No. 5,904,843 to the subject inventor. The water passes through a screen mesh 28 in the bottom of the headwork screen 24 and into a screened water discharge pipe 30. The solids in the waste water are held on the screen mesh 28 and rotated upwardly by screen wiper blades 32. The wiper blades 32 act to dewater the solids and discharge the solids into a solids discharge pipe 34, which drops the solids into the top of a sludge drying bin 36.

The sludge drying bin 36 includes wooden barrier panels 38 in one side of the bin. The panels 38 allow any excess water in the sludge to seep therebetween. Also, the barrier panels 38 are removable for ease in cleaning out the sludge inside the bin. Further, a bottom of the sludge drying bin 36 can be mounted on a fork lift pallet 40 for use by a fork lift in removing the bin 36 from the batch tank 12 and disposing of the sludge stored therein.

The screened water in the water discharge pipe 30 is transferred into a top of an influent surge tank 42 with an oil/water separator 44. The oil/water separator 44 includes a plurality of stacked and ribbed coalescing plates 46 for separating a majority of free oil from the waste water. The ribbed coalescing plates 46 slow the flow of the water and allow ample dwell time for the lighter insoluble oil components in the waste water to rise to the upper portion of the stacked plates. The plates 46 are inclined slightly upwardly from side to side. This feature directs the oil upwardly and unites it with other oil droplets. The oil droplets grow together to form a layer of oil that stays at the top of the surge tank 42. The oil is then drawn into a separate tank for disposal via an oil decant valve 48 and a oil discharge pipe 50. The water, separated from the oil, travels downwardly through the ribbed plates 46 and collects in a lower portion of the surge tank 42. At a slanted bottom of the surge tank 42 is a heavy solids release valve 52, which is connected to the solids discharge pipe 34. The release valve 52 is opened periodically to prevent the accumulation of sand and heavy solids in the bottom of the tank. The heavy solids are directed through the release valve 52 and through the discharge pipe 34 into the sludge drying bin 36. A surge tank discharge pipe 56 is connected near the bottom of the surge tank 42 and is used to drop the waste water through a surge tank waste water valve 54 into a central waste water containment pan 58 in the bottom of the batch tank. It should be mentioned that both the surge tank 42 and the headwork screen 24 are connected to an overflow pipe 59. The overflow pipe 59 allows any excess waste water, that may result from a flow surge or plugged screen 28, to return to the water sump 16.

The containment pan 58 acts as an overall collection area for spilled fluid in the batch tank 12. The containment pan 58 can be designed to cover most of the bottom 14 of the tank 12. Also, the pan 58 can act as a structural skid for the batch tank 12. The sludge drying bin 36 is disposed above the pan 58. Any excess water from the sludge and seeping between the wooden barrier panels 38 falls into the top of the containment pan 58. The waste water in the containment pan 58 is pumped upwardly using a water treatment pump 60 connected to a tank fill pipe 64. The fill pipe 64 discharges the waste water into an electrocoagulation water treatment tank 62 mounted in the top of the batch tank 12. A water fill safety valve 66 is connected to the fill pipe 64 and is used to stop the water treatment pump 60 when the tank 62 is filled.

The electrocoagulation water treatment tank 62 includes two or more electrode plates 68 mounted in an open top 70 of the tank 62. The electrode plates 68 are separated using insulating support spacers 72 for providing proper spacing and insulation between the plates. The electrode plates 68 are connected to electric leads 74 attached to an independent DC power supply 76. The DC power supply 76 is mounted in the batch tank 12 and next to the water treatment tank 62. The electrode plates 68 are used for providing current to the waste water and for removing various contaminates in the water by electrocoagulation. The contaminates removed from the water in the form of floating material or foam float out and over the open top 70 and downwardly into collection gutters 78 on both sides of the tank 62 and through gutter drain pipes 80 and then into a V-Filter 82 for dewatering.

The top of the electrode plates 68 include tabs 83 used for connection to the ends of the electric leads 74. The plates are placed in the tank 62 with alternating spacers 72 to provide electrical insulation as well as proper distance between the electrode plates 68. The spacers 72 can be constructed with various thicknesses and insulating materials to optimize the process and electrode plate spacing. On large sized electrode plates, center spacers can also be used to prevent electromagnetic attraction from pulling the center portions of two adjacent plates closer together. The use of both variable thickness spacers 72 as well as variable thickness electrode plates 68 allows for the optimization of contaminate removal in the waste water when using the subject batch tank system 10.

The polarity of the DC current to the electrode plates 68 can be reversed periodically to help reduce the build up of scale on the plates. Scale is a natural result of the electrocoagulation process, which if not displaced by the reversing of the polarity, will eventually plug the plates. The amount of voltage and amperage to the plates 68 will be determined by the quantity and type of contaminates in the water. Also, the electrode plates 68 with spacers 72 can be configured to allow for different voltages and/or amperages to be applied simultaneously. This type of power flexibility to the plates aids in the optimum removal of the contaminates with minimum power applied or the removal of specific contaminates at different electrode plate locations.

Also, it should be mentioned that the electrode plates 68 will be exposed to ultrasonic sound waves at various frequencies dictated by the contaminates to be removed. The sound waves will help prevent scale build up and the blocking of precipitated contaminates that might plug the flow between the plates. Also, the sound waves will aid in the removal of the contaminates and the settling of heavy solids due to the harmonics created on the electrode plates. The electrocoagulation process using the electrode plates 68 and insulated support spacers 72 are designed to: free oil form an oil water emulsion mixture; free fine particles in colloidal suspension in the waste water; free dissolved metallic ions in the water by electrochemically converting ions into insoluble compounds that precipitate from the solution as an amorphous or crystalline solid; free entrained gaseous compounds or elements that are held in the contaminated fluid by the surface tension of the water in combination with dissolved minerals or other influencing factors; and degrading complex chemical compounds into simpler more stable compounds or elements and harmless organic compounds.

The V-Filter 82 is disposed below the electrocoagulation water treatment tank 62. Heavy solids that are collected in the bottom of the tank 62 are also discharged into the V-Filter via a sludge discharge valve 84 connected to a sludge discharge pipe 86. The V-Filter 92 includes perforated panels 88 covered with filter cloth 90 for filtering the water. The filter 92 also includes an auger 92 for lifting heavy solids upwardly from the bottom of the filter. The heavy solids are discharged from the top of the auger 92 through an auger discharge pipe 94 into the sludge drying bin 36. Water passing through the filter cloth 90 is discharged into the containment pan 58.

The electrocoagulated treated water in the water treatment tank 62 is discharged after a completion of a period of settling or dwell time. At this time, a clean water valve 96 is opened next to a side of the water treatment tank 62. The clean water flows through a water flute 98 mounted above the bottom of the tank, through a clean water discharge pipe 100, through the clean water valve 96, through a bag filter 102, through a polish filter 104 and then finally into a clean water tank 106. The clean water tank 106 is mounted near the bottom 14 of the batch tank 12 and above the containment pan 58. The clean water can now be removed from the clean water tank 106. Also, the sludge can be removed using a forklift to lift the sludge drying bin 36 out of the batch tank 12 for cleaning. After removing the clean water and returning the cleaned sludge drying bin to the batch tank 12, the water waste water treatment process is completed and the treatment system 10 can now be started again with another batch of influent waste water.

Figure 2:
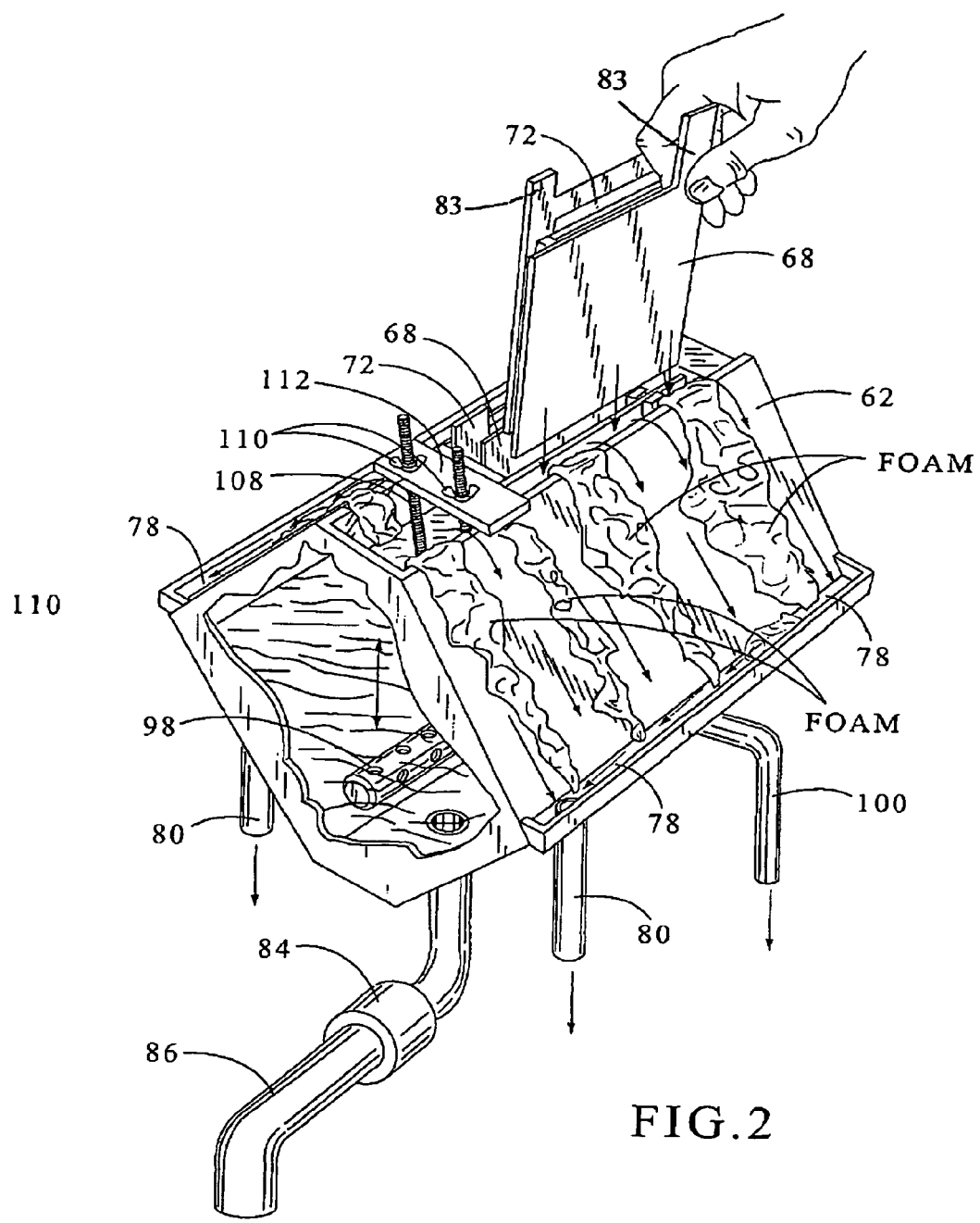
FIG. 2 is a perspective view of the electrocoagulation water treatment tank illustrating vertically mounted electrodes and insulating support spacers slidably mounted in an open top of the tank.

In FIG. 2, a perspective view of the electrocoagulation water treatment tank 62 is shown and illustrating the vertically mounted electrodes 68 with the insulating support spacers 72 disposed therebetween in the open top of the tank. The spacers 72 are used to modify electrode spacing. Also, the support spacers 72 allow the electrodes 68 to easily slide in and out the top of the tank for cleaning. The electrodes 68 and spacers 72 can be constructed of various types of inexpensive materials with variable thicknesses.

In this drawing, a top of a threaded "U" shaped hanger bracket 108 is shown with wing nuts 110 next to a hanger arm 112. The "U" shaped hanger bracket 108 is used to suspend the water flute 98 inside the water treatment tank 62. By adjusting the height of the hanger bracket 108 on the hanger arm 112, the height of the water flute 98 can be adjusted and raised above any heavy solids and sludge that accumulate in the bottom of the tank 62.

Figure 3:
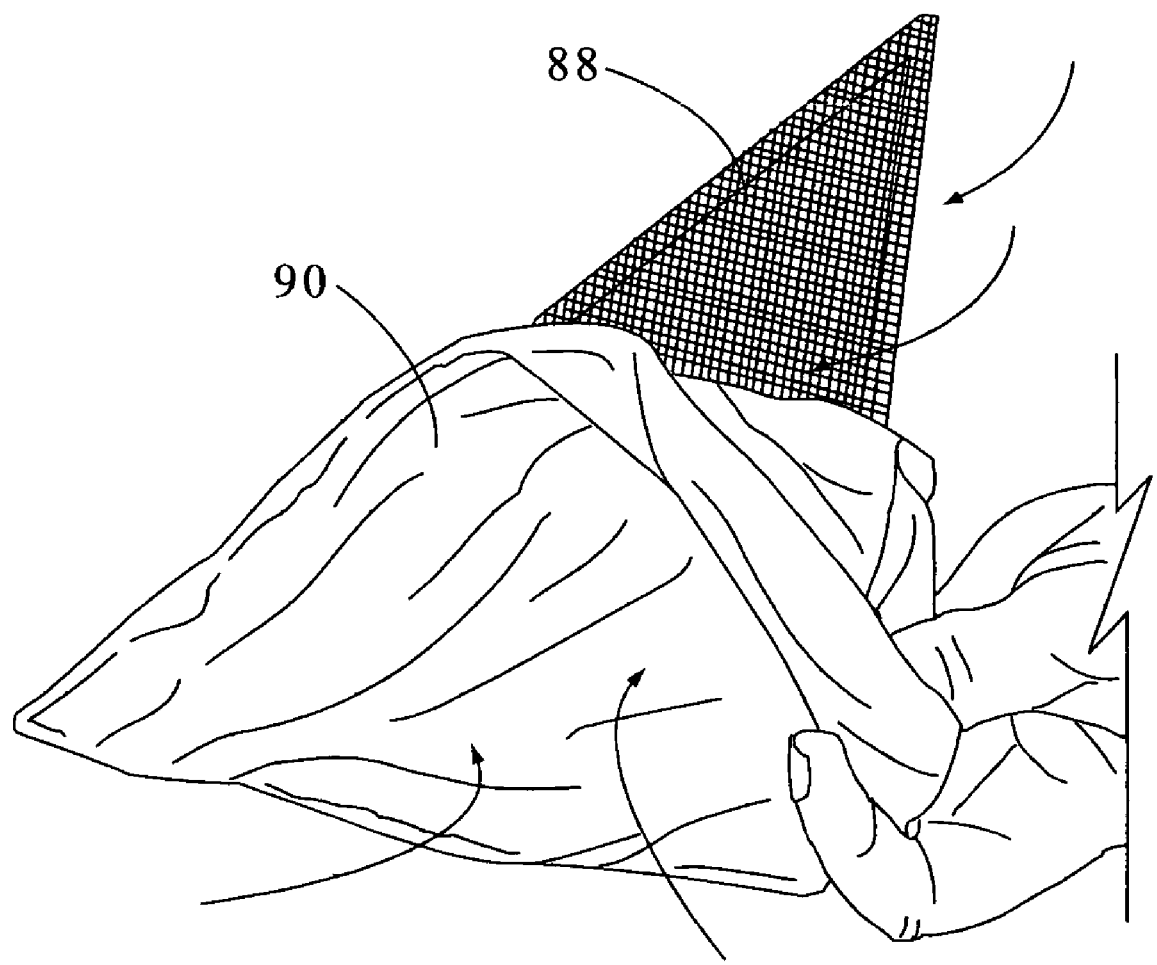
FIG. 3 is a perspective view of one of the perforated panels with removable filter cloth used in a V-Filter with the subject waste water treatment system.

In FIG. 3, a perspective view of one of the perforated panels 88 is shown with a portion of the filter cloth 90 removed from the side of the panel. The panel 88 with filter cloth 90 is used in the V-Filter 82 as shown in FIG. 1.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A batch tank waste water treatment system for treating waste water having various types of contaminants therein, the system receiving the waste water from a waste water source, the system comprising:
   a batch tank having a top, a bottom and sides, said batch tank adapted for receiving and treating a single batch volume of the waste water;
   an influent surge tank with an oil/water separator mounted in the top of said batch tank and adapted for receiving waste water from the waste water source, said oil/water separator including a plurality of coalescing plates adapted for separating free oil from the waste water, the oil is discharged from a top of said surge tank and out of a side of said batch tank, heavy solids at a bottom of said surge tank are drained therefrom;
   sludge and heavy solids receiving means disposed in the bottom of said batch tank for receiving the heavy solids from said surge tank;
   a waste water containment pan disposed in the bottom of said batch tank, said containment pan adapted for receiving the waste water from said surge tank;
   a water treatment pump mounted in said containment pan for pumping the waste water upwardly through a tank fill pipe;
   a water treatment tank mounted in a top of said batch tank, said tank fill pipe attached to said water treatment tank for filling it with waste water, said water treatment tank including at least two electrodes mounted in an open top thereof, said electrodes are separated using insulating support spacers for providing proper electrode spacing and insulation between said electrodes;
   a power supply connected to said electrodes and adapted for applying current to the waste water for electrocoagulation in removing the contaminates therefrom; and
   clean water collection means mounted in said batch tank for receiving clean water from said water treatment tank.

2. The system as described in claim 1 including a headwork screen mounted in the top of said batch tank, said headwork screen receiving the waste water from the waste water source, said headwork screen adapted for removing large solids in the waste water and discharging the large solids in said sludge and heavy solids receiving means.

3. The system as described in claim 1 wherein said water treatment tank includes a water flute mounted below said electrodes for receiving and discharging the clean water that has be electrocoagulated by said electrodes to said clean water collection means.

4. The system as described in claim 3 wherein said clean water collection means is a clean water tank disposed below said water treatment tank, said clean water tank connected to a clean water discharge pipe attached to said water flute in said water treatment tank for receiving the clean water therefrom.

5. The system as described in claim 1 wherein a DC power supply is mounted in said batch tank and next to said water treatment tank, said power supply connected to said electrodes for providing DC current to the waste water and separating the contaminates in the water by electrocoagulation.

6. The system as described in claim 1 further including a V-Filter disposed below said water treatment tank, heavy solids collected in a bottom of said water treatment tank discharged into said V-Filter via a sludge discharge pipe, said V-Filter including perforated panels cover with filter cloth and an auger for lifting heavy solids upwardly from a bottom of said V-Filter, heavy solids are discharged from a top of said auger into said sludge and heavy solids receiving means, water passing through said filter cloth is discharged into said containment pan.

7. The system as described in claim 1 wherein said sludge and heavy solids receiving means is a removable sludge drying bin, said sludge drying bin disposed next to the bottom of said batch tank and above said containment pan, said bin adapted for receiving the large solids from said surge tank via a solids discharge pipe.

8. The system as described in claim 1 wherein the free oil discharged from a top of said surge tank and out of a side of said batch tank is discharged via an oil decant valve connected to a oil discharge pipe.

9. The system as described in claim 1 wherein the waste water from said surge tank is discharged via a surge tank waste water valve connected to a waste water discharge pipe attached near a bottom of said surge tank.

10. A batch tank waste water treatment system for treating waste water having various types of contaminants therein, the system receiving the waste water from a waste water source, the system comprising:
    a batch tank having a top, a bottom and sides, said batch tank adapted for receiving and treating a single batch volume of the waste water;
    a headwork screen mounted in the top of said batch tank, said headwork screen receiving the waste water from the waste water source, said headwork screen adapted for removing large solids in the waste water and discharging the large solids therefrom;
    an influent surge tank with an oil/water separator mounted in the top of said batch tank and adapted for receiving waste water from the waste water source, said oil/water separator including a plurality of stacked coalescing plates adapted for separating free oil from the waste water, the free oil discharged from a top of said surge tank via an oil decant valve connected to a oil discharge pipe, heavy solids at a bottom of said surge tank are drained therefrom;

a removable sludge drying bin, said sludge drying bin disposed next to the bottom of said batch tank, said bin adapted for receiving the large solids from said surge tank and said headwork screen via a solids discharge pipe;

a waste water containment pan disposed in the bottom of said batch tank, said containment pan adapted for receiving the waste water from said surge tank via a surge tank waste water valve connected to a waste water discharge pipe attached near a bottom of said surge tank;

a water treatment pump mounted in said containment pan for pumping the waste water upwardly through a tank fill pipe;

a water treatment tank mounted in a top of said batch tank, said tank fill pipe attached to said water treatment tank for filling it with waste water, said water treatment tank including at least two electrodes mounted in an open top thereof, said electrodes are separated using insulating support spacers for providing proper electrode spacing and insulation between said electrodes;

a DC power supply connected to said electrodes and adapted for applying current to the waste water for electrocoagulation in removing the contaminates therefrom; and clean water collection means mounted in said batch tank for receiving clean water from said water treatment tank.

11. The system as described in claim 10 wherein said water treatment tank includes a water flute mounted below said electrodes for receiving and discharging the clean water that has be electrocoagulated by said electrodes to said clean water collection means.

12. The system as described in claim 11 wherein said clean water collection means is a clean water tank disposed below said water treatment tank, said clean water tank connected to a clean water discharge pipe attached to said water flute in said water treatment tank for receiving the clean water therefrom.

13. The system as described in claim 10 wherein said DC power supply is mounted in said batch tank and next to said water treatment tank, said power supply connected to said electrodes for providing DC current to the waste water and separating the contaminates in the water by electrocoagulation.

14. The system as described in claim 10 further including a V-Filter disposed below said water treatment tank, heavy solids collected in a bottom of said water treatment tank discharged into said V-Filter via a sludge discharge pipe, said V-Filter including perforated panels covered with filter cloth and an auger for lifting heavy solids upwardly from a bottom of said V-Filter, heavy solids are discharged from a top of said auger into said a sludge and heavy solids receiving means, water passing through said filter cloth is discharged into said containment pan.

15. A batch tank waste water treatment process for treating waste water having various types of contaminates therein, the process receiving the waste water from a waste water source, the steps comprising:

introducing a single batch volume of waste water into a batch tank having a top, a bottom and sides;

receiving the waste water into an influent surge tank with an oil/water separator mounted in the top of said batch tank the oil/water separator including a plurality of coalescing plates, separating free oil from the waste water, discharging the oil from a top of said surge tank and out of a side of said batch tank and draining heavy solids from a bottom of said surge tank;

receiving heavy solids and sludge in a sludge drying bin disposed in the bottom of the batch tank from the surge tank;

discharging the waste water from the surge tank to a waste water containment pan disposed in the bottom of the batch tank and pumping the waste water from the containment pan to a water treatment tank mounted in a top of said batch tank;

treating the waste water in the water treatment tank with electrically charged electrodes mounted in an open top of the water treatment tank, the electrodes are separated using insulating support spacers for providing proper electrode spacing and insulation between the electrodes;

discharging the clean water from the water treatment tank into a clean water tank disposed in the batch tank.

16. The process as described in claim 15 wherein the clean water from the water treatment tank is circulated through a bag filter and polish filter prior to being discharged into the clean water tank.

17. The process as described in claim 15 further including a step of receiving the waste water in a headwork screen mounted in the top of the batch tank prior to receiving the waste water in the surge tank, the headwork screen removing large solids in the waste water and discharging the large solids in the sludge drying bin.

18. The process as described in claim 15 wherein said water treatment tank includes a water flute mounted below the electrodes for receiving and discharging the clean water that has be electrocoagulated by the electrodes to the clean water tank.

19. The process as described in claim 15 wherein the electrodes are electrically charged using DC power from a DC power supply mounted in the batch tank and next to the water treatment tank, the power supply connected to the electrodes for providing DC current to the waste water and separating the contaminates in the water by electrocoagulation.

20. The process as described in claim 15 further including a V-Filter disposed below the water treatment tank for receiving heavy solids collected in a bottom of the water treatment tank and foam and floating material from the open top of the water treatment tank, the V-Filter including perforated panels cover with filter cloth and an auger for lifting heavy solids upwardly from a bottom of the V-Filter, the heavy solids discharged from a top of the auger into the sludge drying bin, the water passing through the filter cloth discharged into the containment pan.

* * * * *